United States Patent [19]

Wiernicki

[11] 4,413,950
[45] Nov. 8, 1983

[54] HALL SWITCH PUMP

[75] Inventor: Michael V. Wiernicki, Trumansburg, N.Y.

[73] Assignee: Facet Enterprises, Incorporated, Tulsa, Okla.

[21] Appl. No.: 191,055

[22] Filed: Sep. 25, 1980

[51] Int. Cl.³ .................. F04B 17/04; H02K 33/10
[52] U.S. Cl. .................................. 417/53; 417/417; 310/34; 318/127
[58] Field of Search ............. 417/417, 53; 310/31, 310/34, 30; 318/128, 132, 127

[56] References Cited

U.S. PATENT DOCUMENTS

| | | | |
|---|---|---|---|
| 3,293,516 | 12/1966 | Maier et al. | 318/132 X |
| 3,364,361 | 1/1968 | Burger | 91/275 X |
| 3,515,966 | 6/1970 | De Valroger et al. | 310/31 X |
| 4,086,518 | 4/1978 | Wilkinson | 417/417 X |

OTHER PUBLICATIONS

M. Oppenheimer, "In IC Form, Hall-Effect Devices Can Take on Many New Applications", Electronics, pp. 46-49, Aug. 2, 1971.
J. L. Di Filippo, "A Silicon Hall Effect Latching Switch", Conference Proc. 30th Electronic Components Conference (28-30 Apr. 1980), IEEE.

Primary Examiner—Leonard E. Smith
Attorney, Agent, or Firm—Remy J. VanOphem

[57] ABSTRACT

An electromagnetic fluid pump having a magnet attached to a reciprocating piston and a Hall effect switch detecting the magnetic field generated by the moving magnet. In a first position of the magnet, the magnetic field through the hall effect switch is in a first direction causing the hall effect switch to generate a signal having a first polarity. In a second position of the magnet the magnetic field through the hall effect switch is reversed, reversing the polarity of the signal generated by the hall effect switch. An electronic switch circuit responsive to the signal generated by the hall effect having the first polarity to energize the solenoid coil to retract the piston from the first position to the second position against the force of a spring and further responsive to the signal having a reversed polarity to deenergize the solenoid coil when the piston is in said second position.

16 Claims, 7 Drawing Figures

HALL SWITCH PUMP

CROSS REFERENCE

The invention is related to copending commonly assigned application Ser. No. 139,516, filed Apr. 11, 1980, entitled "Reciprocating Fluid Pump Having a Hall Switch" by Ralph V. Brown which also discloses the use of a hall effect switch to detect the position of a reciprocating piston.

BACKGROUND OF THE INVENTION

1. Field of the Invention

The present invention relates to the field of reciprocating electromagnetic devices, and in particular to a solenoid driven pump having a magnet attached to the reciprocating piston activating a hall effect switch to produce a signal having a magnitude and polarity indicative of the position of a reciprocating piston.

2. Description of the Prior Art

Reciprocating piston electromagnetic fluid pumps as disclosed in the patent to Parker, U.S. Pat. No. 2,994,792, and Wertheimer, U.S. Pat. No. 3,381,616, have obtained wide commercial acceptance, but in a highly competitive field, improvements are very important. The earlier models of these pumps, as represented by Parker include an electrical switch in circuit relationship with a solenoid which is either mechanically or magnetically actuated by the piston at the end of the pumping stroke. Closing the switch energizes the solenoid retracting the piston to its cocked position. When the piston reaches the cocked position, the switch opens, deenergizing the solenoid and the pumping stroke is carried out under the force of a compressed spring. Although these types of pumps function very satisfactorily and have reasonable operating life, the electrical switch is subject to failure and is determinative of the pump's operating life.

To increase the life of the pump, blocking oscillators were subsequently introduced such as taught by Wertheimer and Brown in U.S. Pat. No. 3,629,674. Blocking oscillators eliminated the electrical switch and increased the operating life of the pump.

Disclosed herein is a reciprocating piston electromagnetic fluid pump in which the mechanical switch is replaced by a hall effect switch generating a signal having a magnitude and polarity indicative of the piston's position.

SUMMARY OF THE INVENTION

The invention is an electromagnetic fluid pump having a magnet attached to a piston reciprocated in response to the periodic energizing of a solenoid coil. A hall effect switch generates a signal which reverses polarity in response to a change in the direction of the magnetic field through the hall effect switch as the magnet is reciprocated with the piston. An electronic switch circuit responsive to only a signal of a predetermined polarity energizes a solenoid coil which retracts the piston against a resilient force. As the piston is retracted, the magnetic field across the hall effect switch is reversed causing the polarity of the generated signal to reverse. The electronic switch circuit responds to the reversal of the signal from the hall effect switch and deenergizes the solenoid coil. The piston is then moved by the resilient force in the opposite direction.

The object of the invention is an electromagnetic fluid pump having a hall effect switch detecting the position of a reciprocating piston. Another object of the invention is an electromagnetic fluid pump having a solenoid coil energized by an electronic switch circuit responsive to a reversal in the polarity of the signal generated by a hall effect switch. A further object of the invention is an electromagnetic pump in which the position of the reciprocating piston is detected by a solid state device having no movable parts or electrical contacts. Another object of the invention is an electromagnetic fluid pump having an increased operating life.

These and other objects of the invention will be understood from the detailed description read in conjunction with the accompanying figures.

DETAILED DESCRIPTION OF THE INVENTION

Figure 1:
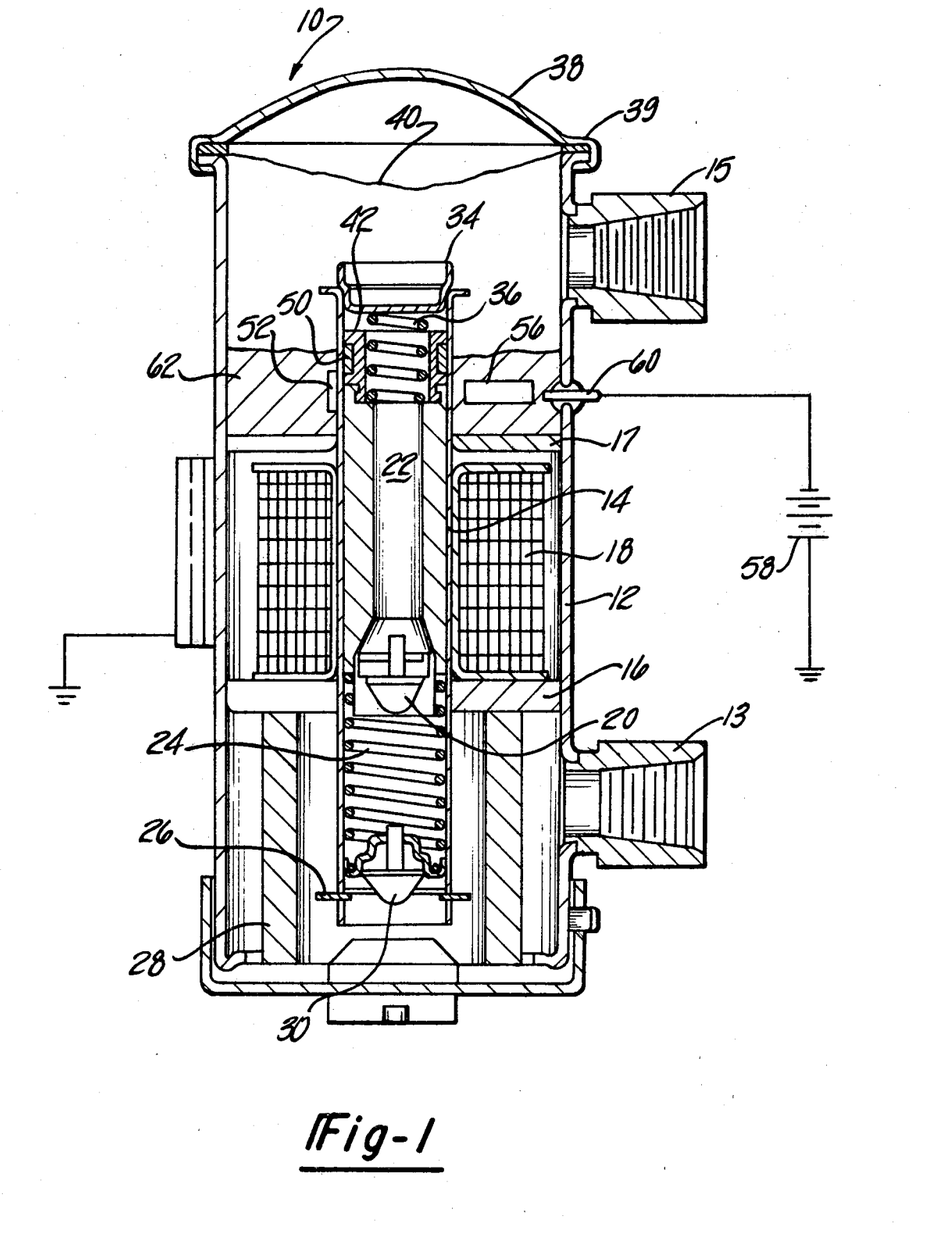
FIG. 1 is a cross-sectional view of an electromagnetic fluid pump incorporating the disclosed invention.

Referring to FIG. 1, the numeral 10 indicates generally an electromagnetic fluid pump having a cylindrical housing 12 with a fluid inlet 13 and fluid outlet 15. Contained within the housing 12 is a nonmagnetic guide or cylinder member 14 which is supported within the housing by pole members or annuli 16 and 17. Disposed intermediate the pole members 16 and 17 is a solenoid coil 18 circumscribing guide member 14. A hollow magnetically permeable piston member 22 is disposed inside the guide member 14 and is free to reciprocate therein. A one way valve 20 is disposed at the inlet end of the piston member 22. A second one way valve 30 is disposed at the inlet end of the guide member 14. The action of one way valves 20 and 30 combine in a known way to provide a unidirectional fluid flow through said guide member 14 from the inlet 13 to the outlet 15 as the piston 22 is reciprocated. A spring 24 is compressively disposed within the guide member 14 between the piston member 22 and the one way valve 30. A lock ring 26 restrains the movement of the valve 30 in a direction away from the piston 22. A filter member 28 may be disposed in the housing 12 between the fluid inlet 13 and the lower end of the guide member to filter out containment which could foul the operation of the pump.

An abutment member 34 is fixedly attached to the upper end of the guide member 14 and compressively confines a spring 36 between itself and the upper end of piston 22. Spring 36 provides for storage of the pistons kinetic energy over part of the flow range. This energy is returned to the piston during the reverse travel. Resonant operation will then be achieved with an increase in efficiency and capacity. A cap member 38 is clamped or otherwise fitted over the top of the housing 12 as shown at 39 to provide a fluid tight seal. A flexible diaphragm 40 is rigidly attached to the cap member 38 to surpress peak fluid pressure pulses generated by the reciprocating piston. The pump configuration described thus far is identical to the pump illustrated and described in U.S. Pat. No. 4,080,552, "Hybrid Blocking Oscillator for an Electromechanical Pump" and represents a basic configuration of an electromagnetic fluid pump.

Figure 2:
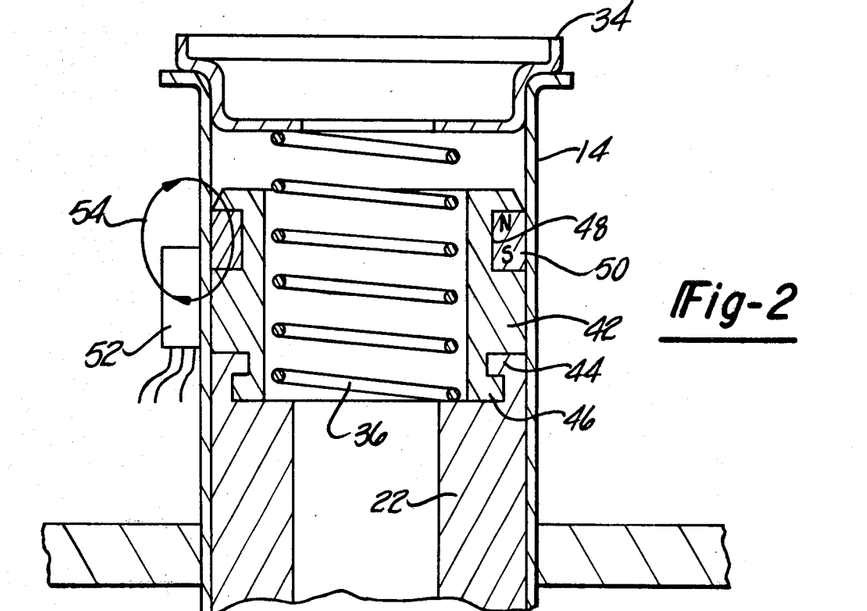
FIG. 2 is a partial cross section of the fluid pump showing the position of the magnet relative to the hall effect switch at the end of the pumping stroke.
Figure 3:
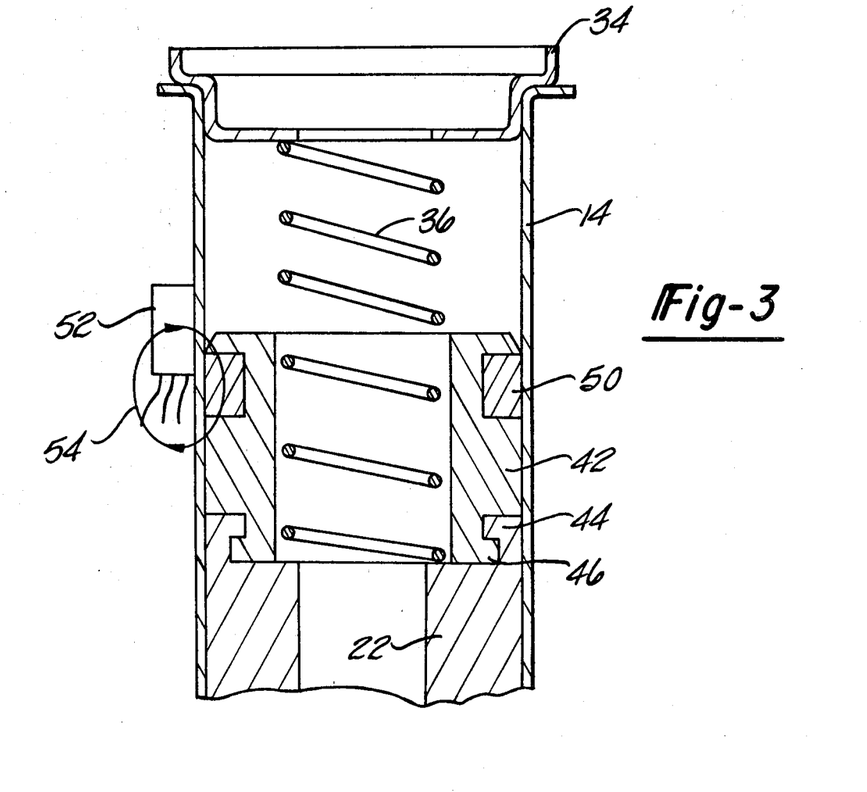
FIG. 3 is a partial cross section of the fluid pump showing the position of the magnet relative to the hall effect switch with the piston in the cocked position.

FIGS. 2 and 3 are enlarged cross sections of the pump above the pole member 17. Referring to FIGS. 1 and 2, piston 22 is shown at the end of its pumping stroke. A nonmagnetic annular bushing 42, is attached to the top of piston 22 by means of a pair of interlocking dogs 44 and 46 formed in the piston 22 and bushing 42 respectively. An annular magnet 50 is captivated in an annular groove 48 formed at the upper end of the bushing 42. The annular magnet 50 is axially polarized with its poles arranged parallel to the axis of guide member 14. The bushing 42 and magnet 50 reciprocate with the piston 22 inside of guide 14.

Disposed on the external surface of the guide 14 adjacent to the path of the reciprocating piston 22 is a hall effect switch 52. The hall effect switch 52 is located with respect to the magnet 50 such that when the piston 22 approaches the end of its stroke, the magnet flux lines 54 flowing externally about magnet 50 pass through the hall effect switch 52 in a direction as indicated by the magnet flux path 54. This causes the hall effect switch 52 to generate an output signal having a first polarity.

Referring now to FIG. 3, the piston 22 is shown in its retracted or cocked position. In this position, the magnet 50 has been moved downwardly with reference to the hall effect switch 52, and now the magnetic flux path 54 passes through the hall effect switch in the opposite direction as indicated by the arrows. When the direction of the flux lines through the hall effect switch are reversed, the polarity of the signal generated by the hall effect switch 52 reverses.

Returning back to FIG. 1, the signal generated by the hall effect switch 52 is received by an electronic switch circuit 56. The electronic switch circuit 56 responds to the signal from the hall effect switch 52 having the first polarity to energize the solenoid coil 18. The electronic switch circuit 56 receives electrical power from an external source, such as battery 58, through an insulated feedthrough 60 passing through the housing 12. The opposite pole of battery 58 is connected to housing 12 through an intermediate common ground. The hall effect switch 52 and the electrical switch circuit 56 may be encapsulated within housing 12 above pole 17 using a conventional electronic potting material 62 as is known in the art.

Figure 4:
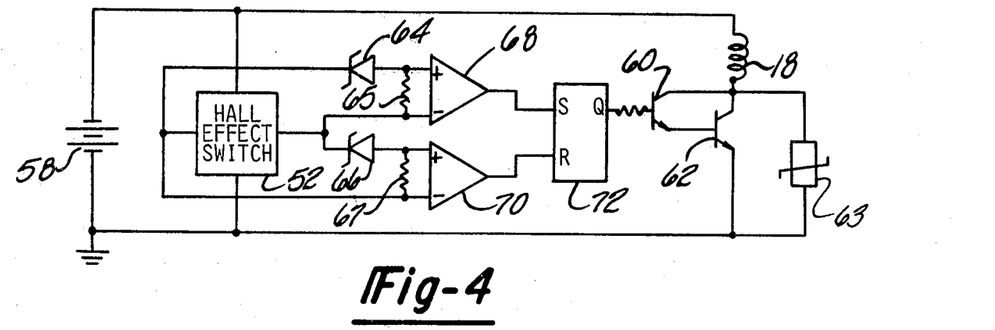
FIG. 4 is a circuit diagram of the electronic switch circuit.

The details of the electronic switch circuit 56 which energizes the solenoid coil 18 are shown on FIG. 4. The positive pole of a source of electrical power, such as battery 58 is connected to the positive terminal of the hall effect switch 52, and one end of the solenoid coil 18. The negative terminal of the battery 58 is connected to the negative input to the hall effect switch 52, to the emitter of a transistor 62 and to a common ground. One output of the hall effect switch 52 is connected to the cathode of a zener diode 64 and to the negative input of a comparator 70. The anode of zener diode 64 is connected to the positive input of a comparator 68 and to the negative input of comparator 68 through a resistor 65. The other output of the hall effect switch 52 is connected to the cathode of a zener diode 66 and to the negative input of comparator 68. The anode of zener diode 66 is connected to the positive input of comparator 70 and to the negative input of comparator 70 through a resistor 67.

The outputs of comparators 68 and 70 are connected to the set (S) and reset (R) inputs of a bi-stable switch such as R.S. flip-flop 72. The $\overline{Q}$ output of flip-flop 72 is connected to the base of transistor 60, the emitter of which is connected to the base of transistor 62. The collectors of transistors 60 and 62 are connected to the other end of coil 18. The transistors 60 and 62 are arranged in the familiar Darlington amplifier circuit. A metal oxide varistor (MOU) 63 is connected in parallel with the collector and emitter terminals of transistor 62.

Figure 5:
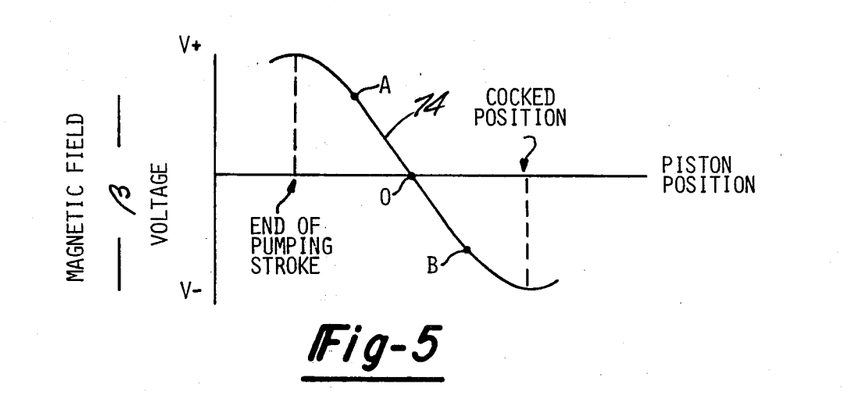
FIG. 5 is a graph showing the output of the hall effect switch as a function of the piston's position.

The operation of the electronic switch circuit 56 shall be described with reference to FIGS. 4 and 5. FIG. 5 shows the differential output voltage of the hall effect switch as a function of the strength and direction of the magnetic fluid and as a function of the position of the piston 22. Referring first to FIG. 5 when the piston 22 is at the end of its stroke, the differential voltage between the two outputs of the hall effect switch has a maximum positive potential $V_1$ which varies as the piston 22 is moved to its cocked position to a maximum negative potential as indicated by curve 74. The crossover potential of zener diode 64 is selected at the potential designated A an curve 74 and the crossover potential of zener diode 66 is selected at the potential designated "B" on curve 74. Referring now to FIG. 4 when the piston 22 is at the end of its pumping stroke, the positive potential difference between the two output electrodes of the hall effect switch is greater than the crossover potential of zener diode 64. This makes the potential applied to the positive input of comparator 68 more positive than the potential applied to its negative input. At the same time the potential applied to the negative input to comparator 70 is more positive than the potential applied to its positive input. Comparator 68 generates an output signal which sets flip flop 72. In its set state, flip flop 72 generates a high signal at its $\overline{Q}$ output which is applied to the base of transistor 60 causing it to conduct. The conductance of transistor 60 supplies base current to transistor 62 making it conductive. Conduction of transistor 62 energizes solenoid coil 18 to attract piston 22 towards its cocked position. After the piston 22 passes the point designated O the polarity of the signals applied to the inputs of comparator 68 reverse, terminating its output. Flip flop 72 remains in its set state until the piston passes point B at which the differential potential generated by the hall effect switch 52 exceeds the crossover potential of zener diode 66. The potential at the positive input to comparator 70 now exceeds the potential applied to its negative input. This causes comparator 70 to generate an output signal which resets flip flop 72 terminating the high signal at its $\overline{Q}$ output. The termination of high signal at the $\overline{Q}$ output of flip flop 72 back biases transistors 60 and 62 deenergizing solenoid coil 18. The momentum of the piston 22 will carry it beyond point "B". At some point beyond "B" the force of spring 24 will overcome the pistons' momentum. The piston 22 will then reverse its direction motion and begin its pumping stroke moving back toward point A. Maximum efficiency is obtained by placing point "A" as close to the end of pumping stroke as possible so that the magnetic force does not oppose the piston's motion.

Flip flop 72 will remain in its reset state until piston 22 passes point "A" as indicated on FIG. 5. After the piston passes point "A" the differential potential generated across the outputs of the hall effect switch 52 will again exceed the crossover potential of zener diode 64 and the output of comparator 68 will again set flip flop 72. Solenoid coil 18 will be energized retracting the piston 22 towards the cocked position once more. The above described cycle will be repeated, with the momentum of piston 22 carrying it somewhat beyond the points designated "A" and "B" during each cycle. The piston 22 will, therefore, oscillate between the points designed "end of pumping stroke" and "cocked position" as indicated on FIG. 5. Obviously, the selection of points "A" and "B" can be selected to lengthen or shorten the pumping stroke as desired.

Figure 6:
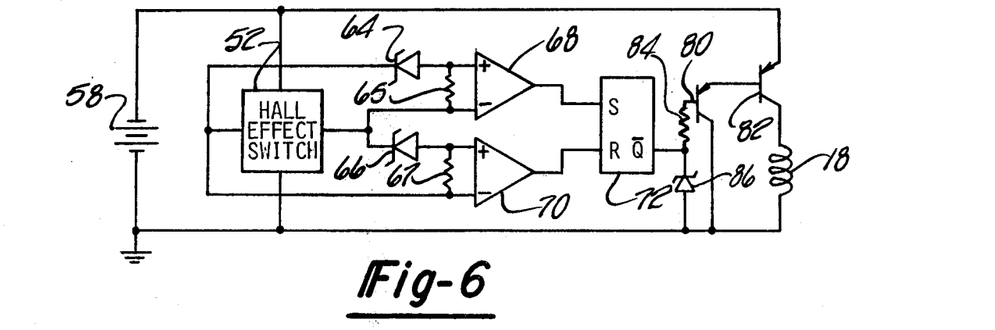
FIG. 6 is a circuit diagram of an alternate configuration of the electronic switch circuit shown in FIG. 5.

An alternate configuration of the switching circuit 56 is shown in FIG. 6. This circuit is basically the same as the one shown in FIG. 4 except that the npn transistors 60 and 62 are replaced with pnp transistor 80 and 82. This permits one end of the solenoid soil to be connected directly to the common ground. The operation of the circuit shown on FIG. 6 is identical to the operation of the circuit shown on FIG. 4 except that the base of transistor 80 is connected to the $\overline{Q}$ output of flip flop 72 through a resistance 84. Resistor 84 and zener diode 68 perform the same basic function as the metal oxide varistor 63 of FIG. 4, i.e., protection of transistor 82 from voltage spikes on the voltage supply. The $\overline{Q}$ output of flip flop 72 is also connected to ground through zener diode 86. When flip flop 72 is set by the output of comparator 68, the $\overline{Q}$ output of flip flop 72 goes low forward biasing transistor 80. The conductance of transistor 80 forward biases transistor 82 energizing solenoid coil 18.

Figure 7:
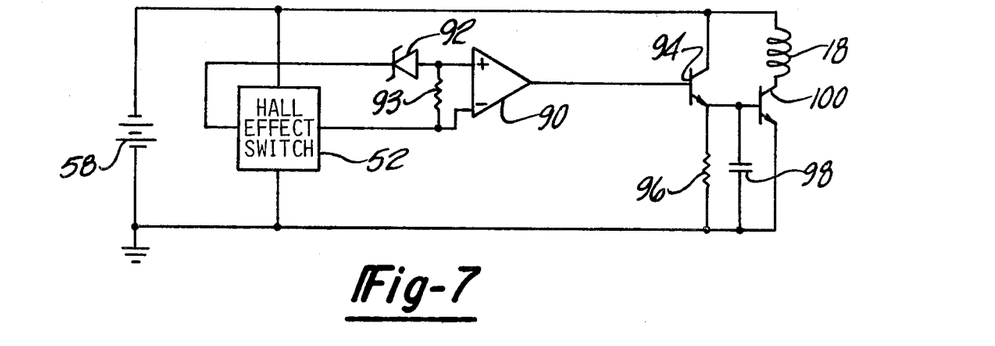
FIG. 7 is a circuit diagram of a third embodiment of the electronic switch circuit.

A third embodiment of switching circuit 56 is shown on FIG. 7. Referring to FIG. 7, the positive terminal of the battery 58 is connected to the positive input of the hall effect switch 52, the collector of a first transistor 94 and to the collector of a second transistor 100 through the solenoid coil 18. The negative terminal of the battery 58 is connected to the negative input to the hall effect switch, to the emitter of transistor 94 through resistor 98, to the emitter of transistor 100 and to a common ground. The emitter of transistor 94 is also connected to the base of transistor 100 and is coupled to ground by a capacitor 98 in parallel with resistor 96.

One output of the hall effect switch 52 is connected to the cathode of zener diode 92 which has a crossover potential equal to the potential designated "A" on curve 74 of FIG. 5. The anode of zener diode 92 is connected directly to the positive input of comparator 90 and to the negative input of comparator 90 through resistance 93. The other output of the hall effect switch 52 is connected directly to the negative input of comparator 90. The output of comparator 90 is connected to the base of transistor 94.

The operation of the circuit shown on FIG. 7 is as follows. When the piston 22 is at the end of its pumping stroke, the output of the hall switch is greater than the crossover potential of zener diode 92 making the potential applied to the positive input of comparator 90 more positive than the potential applied to its negative input. The comparator 90 generates a signal forward biasing transistor 94 causing it to conduct. The conductance of transistor 94 forward biases transistor 100 energizing solenoid coil 18 and charges capacitor 98. The energizing of the solenoid coil 18 as before retracts piston 22 towards its cocked position. When the piston 22 passes the point designated O on FIG. 5, the potential on the outputs of the hall effect switch reverse polarity terminating the signal from comparator 90 to the base of transistor 94. This back biases transistor 94 and it ceases to conduct. Transistor 100 continues to be forward biased by the discharge of capacitor 98. The values of resistor 96 and capacitance 98 are selected to maintain transistor 100 forward biased until the piston reaches point "B". As previously described, the momentum of piston 22 will carry it as a short way beyond point B to the cocked position. The spring 24 will then urge the piston forward on its pumping stroke until it reaches point "A" where the differential output of the hall effect switch 52 exceeds the crossover potential of zener diode 92. At this point, comparator 90 will again produce an output signal forward biasing transistors 94 and 100 to energize solenoid coil 18 and charging capacitor 98. The cycle will repeat oscillating the piston between its cocked position and the end of its pumping stroke.

It is submitted that persons skilled in the art will be able to devise other circuits responsive to the change in polarity of the hall effect switch to periodically energize a solenoid coil to oscillate a movable member without departing from the spirit of the invention. It is not intended that the invention be limited to controlling the oscillation of piston in a pump as described and illustrated but may also be used to oscillate a movable member in other types of devices.

What is claimed is:

1. A method for reciprocating a magnetically permeable piston member along a predetermined path in an electromagnetic device having a resilient member urging said magnetically permeable piston member in one direction along said predetermined path and a solenoid coil for pulling said magnetically permeable piston member in the opposite direction against the force of said resilient member, said method comprising the steps of:

reciprocating a magnet attached to said magnetically permeable piston member along said predetermined path, the magnetic poles of said magnet being arranged parallel to the direction of motion of said magnetically permeable piston member along said predetermined path;

placing a hall effect switch sensitive to the direction of the magnetic field generated by said magnet intermediate the two extremes of the motion of said magnet as it is reciprocated with said magnetically permeable piston member to generate a differential signal having a magnitude and polarity indicative of the position of said magnetically permeable piston member along said path, said hall effect device producing a first signal at a first output terminal and a second signal at a second output terminal and said differential signal being the difference between said first signal and said second signal;

activating an electronic switch circuit to energize said solenoid coil in response to said differential signal having a magnitude and polarity indicative of said magnetically permeable piston member being pushed to a position near said one end of said predetermined reciprocation path of said magnet under the influence of said force generated by said resilient member, said step of activating said electronic switch means to energize said solenoid coil further comprising the steps of detecting when said differential signal has a first predetermined magnitude and a first polarity by comparing the magnitude of the difference between said first signal and said second signal with said first predetermined magnitude and said first polarity to generate a SET signal, switching a bistable means to a first state in response to said SET signal to generate a biased signal, connecting a transistor means in series with said solenoid coil to control the current flow therethrough, and forward biasing said transistor means to its conductive state with said biased signal to energize said solenoid coil; and activating said electronic switch circuit to deenergize said solenoid coil in response to said predetermined signal having a magnitude and polarity indicative of said magnetically permeable piston member being pulled to a position near said other end of said predetermined reciprocation path of said magnet under the influence of said force generated by said energized solenoid coil, said step of activating said electronic switch circuit to deenergize said solenoid coil further comprising the steps of detecting when said differential signal has a second predetermined magnitude and a reversed polarity opposite said first polarity by comparing the difference between said first signal and said second signal with said second predetermined magnitude and said second polarity to generate a RESET signal, switching a bistable means to its second state in response to said RESET signal to terminate said biased signal, and backward biasing said transistor means with the termination of said biased signal to its nonconductive state to deenergize said solenoid coil.

2. The method of claim 1, wherein said first and second step of detecting are performed by a first and a second comparator circuit.

3. The method of claim 2 wherein said bi-stable means is an R-S flip flop circuit.

4. The method of claim 3 wherein said transistor means is a Darlington amplifier.

5. The method of claims 1 or 4 wherein said device is an electromagnetic fluid pump and said magnetically permeable member is a reciprocating piston.

6. An electromagnetic fluid pump comprising:
an enclosed housing having an inlet port and an outlet port;
a cylindrical guide disposed in said enclosed housing defining a fluid flow path through said enclosed housing, said cylindrical guide having one end proximate said inlet port and another end proximate said outlet port;
a magnetically permeable piston member disposed in said cylindrical guide, said magnetically permeable piston member being free to reciprocate therein;
valve means for providing a unidirectional fluid flow through said cylindrical guide in response to the reciprocating movement of said magnetically permeable piston member;
biasing means for urging said magnetically permeable piston member towards said other end of said cylindrical guide proximate said outlet port;
solenoid coil means disposed concentrically about said cylindrical guide for moving said magnetically permeable piston member towards said one end of said cylindrical guide proximate said inlet port against the force of said biasing means;
a magnet attached to said magnetically permeable piston member for reciprocating therewith to define a reciprocating path of motion, said magnet having its magnetic poles disposed parallel to the axis of said cylindrical guide;

hall effect means disposed intermediate the extremities of said reciprocating path of motion of said magnet for generating a predetermined signal, said predetermined signal varying from a first magnitude and polarity when said magnet is at one extremity of said reciprocating path to a second magnitude of reversed polarity when said magnet is at the opposite extremity of said reciprocating path;

polarity sensitive means for generating a biasing signal in response to said predetermined signal generated by said hall effect means having said first polarity and for terminating said biasing signal in response to said predetermined signals having said reversed polarity, said polarity sensitive means further comprising:

(a) a first comparator for generating a SET signal in response to said predetermined signal generated by said hall effect means having said first polarity;

(b) a second comparator for generating a RESET signal in response to said predetermined signal generated by said hall effect means having said reversed polarity; and (c) bi-stable switch means for generating said biasing signal in response to said SET signal, and for terminating said biasing signal in response to said RESET signal; and solid state switch means for energizing said solenoid coil means in response to said biasing signal.

7. The fluid pump of claim 6 wherein said at least one transistor is at least one transistor having its collector and emitter electrodes connected in series with said solenoid coil.

8. The fluid pump of claim 7 wherein said solid state switch is a Darlington amplifier connected in series with said solenoid coil.

9. The fluid pump of claim 6 wherein said solid state switch means comprises:
a first transistor forward biased by said bias signal;
a second transistor having its collector and emitter electrodes connected in series with said solenoid coil and a base connected to the emitter of said first transistor; and
delay means connected to the base of said second transistor for forward biasing said second transistor for a predetermined time after the termination of said biasing signal to said first transistor.

10. The fluid pump of claim 9 wherein said delay means is an R-C time constant network comprising:
a resistor connected between the base and the emitter of said second transistor; and
a capacitor connected in parallel with said resistor.

11. An electromagnetic switching circuit for reciprocating a magnetically permeable piston member along a predetermined path in an electromagnetic actuator having a resilient member urging the magnetically permeable piston member in a first direction along said predetermined path and a solenoid coil for pulling said magnetically permeable piston member in the opposite direction against the force of said resilient member comprising:
a magnet attached at one end of said magnetically permeable piston member and operative to reciprocate along said predetermined path with said magnetically permeable piston member, the magnetic poles of said magnet being parallel to said predetermined path;

a hall effect detector, disposed intermediate the ends of said predetermined path of said magnet and adjacent to said predetermined path of said magnet for generating a first signal having a first polarity indicative of said magnetically permeable piston member being near one end of said predetermined path and a second signal having a second polarity opposite to said first polarity, said second polarity being indicative of said magnetically permeable piston member being near the other end of said predetermined path; and electronic switch means for energizing said solenoid coil in response to said first signal having said first polarity indicating said magnetically permeable piston member is approaching said one end of said predetermined path of said magnet, said electronic switch means further deenergizing said solenoid coil in response to said second signal having said second polarity opposite to said first polarity indicating said magnetically permeable piston member is approaching the other end of said predetermined path of said magnet; said electronic switch means further comprising:

(a) polarity sensitive means for generating a biasing signal in response to said first signal generated by said hall effect detector having said first polarity and for terminating said biasing signal in response to said second signal having a second polarity opposite to said first polarity, said polarity sensitive means further comprising a first comparator for generating a SET signal in response to said first signal generated by said hall effect detector having said first polarity, a second comparator for generating a RESET signal in response to said second signal generated by said hall effect detector having said second polarity opposite to said first polarity, and bistable switch means for generating said biasing signal in response to said SET signal, and for terminating said biasing signal in response to said RESET signal; and (b) solid state switch means for energizing said solenoid coil in response to said biasing signal.

12. The electromagnetic circuit of claim 11 wherein said solid state switch is at least one transistor having its collector and emitter electrodes connected in series with the solenoid coil.

13. The electromagnetic circuit of claim 11 wherein said solid state switch means is a Darlington amplifier.

14. The electromagnetic circuit of claim 11 wherein said solid state switch comprises:

a first transistor forward biased by said bias signal;

a second transistor having its collector and emitter electrodes connected in series with said solenoid coil and a base connected to the emitter of said first transistor; and delay means connected to the base of said second transistor for forward biasing said second transistor for a predetermined time after the termination of said biasing signal to said first transistor.

15. The electromagnetic circuit of claim 14 wherein said delay means is an R-C time constant network comprising:

a resistor connected between the base and the emitter of said second transistor; and a capacitor connected in parallel with said resistor.

16. The electromagnetic circuit of claim 11 wherein the electromagnetic actuator is a fluid pump and said magnetically permeable member is a piston, the reciprocating motion of which pumps a fluid through the pump.

* * * * *

UNITED STATES PATENT AND TRADEMARK OFFICE
CERTIFICATE OF CORRECTION

PATENT NO. : 4,413,950

DATED : November 8, 1983

INVENTOR(S) : Michael V. Wiernicki

It is certified that error appears in the above-identified patent and that said Letters Patent is hereby corrected as shown below:

The title page should be deleted to appear as per attached title page.

Sheet 1 of the drawings should be deleted and Sheet 1 as per attached substituted therefor.

United States Patent [19]

Wiernicki

[11] 4,413,950
[45] Nov. 8, 1983

[54] HALL SWITCH PUMP

[75] Inventor: Michael V. Wiernicki, Trumansburg, N.Y.

[73] Assignee: Facet Enterprises, Incorporated, Tulsa, Okla.

[21] Appl. No.: 191,055

[22] Filed: Sep. 25, 1980

[51] Int. Cl.³ .................... F04B 17/04; H02K 33/10
[52] U.S. Cl. ............................. 417/53; 417/417; 310/34; 318/127
[58] Field of Search ............. 417/417, 53; 310/31, 310/34, 30; 318/128, 132, 127

[56] References Cited

U.S. PATENT DOCUMENTS

| | | | |
|---|---|---|---|
| 3,293,516 | 12/1966 | Maier et al. | 318/132 X |
| 3,364,361 | 1/1968 | Burger | 91/275 X |
| 3,515,966 | 6/1970 | De Valroger et al. | 310/31 X |
| 4,086,518 | 4/1978 | Wilkinson | 417/417 X |

OTHER PUBLICATIONS

M. Oppenheimer, "In IC Form, Hall-Effect Devices Can Take on Many New Applications", Electronics, pp. 46-49, Aug. 2, 1971.
J. L. Di Filippo, "A Silicon Hall Effect Latching Switch", Conference Proc. 30th Electronic Components Conference (28-30 Apr. 1980), IEEE.

*Primary Examiner*—Leonard E. Smith
*Attorney, Agent, or Firm*—Remy J. VanOphem

[57] ABSTRACT

An electromagnetic fluid pump having a magnet attached to a reciprocating piston and a Hall effect switch detecting the magnetic field generated by the moving magnet. In a first position of the magnet, the magnetic field through the hall effect switch is in a first direction causing the hall effect switch to generate a signal having a first polarity. In a second position of the magnet the magnetic field through the hall effect switch is reversed, reversing the polarity of the signal generated by the hall effect switch. An electronic switch circuit responsive to the signal generated by the hall effect having the first polarity to energize the solenoid coil to retract the piston from the first position to the second position against the force of a spring and further responsive to the signal having a reversed polarity to deenergize the solenoid coil when the piston is in said second position.

16 Claims, 7 Drawing Figures

U.S. Patent  Nov. 8, 1983  Sheet 1 of 3  4,413,950

Fig-1

UNITED STATES PATENT AND TRADEMARK OFFICE
CERTIFICATE OF CORRECTION

PATENT NO. : 4,413,950

DATED : November 8, 1983

INVENTOR(S) : Michael V. Wiernicki

It is certified that error appears in the above-identified patent and that said Letters Patent is hereby corrected as shown below:

Col. 1, line 22, cancel "patent" and insert ---patents---;

Col. 1, line 27, after "Parker" insert ---,---;

Col. 1, line 36, after "have" insert ---a---;

Col. 1, line 67, after "is" insert ---to provide---;

Col. 2, line 39, cancel "guide" and insert ---guide member---;

Col. 2, line 44, cancel "piston member" and insert ---piston---;

Col. 2, line 47, cancel "piston member 22. A second" and insert therefor ---piston 22. Another---;

Col. 2, line 50, cancel "said" and insert therefor ---the---;

Col. 2, line 55, cancel "valve" and insert therefor ---one-way valve---;

Col. 2, lines 58 and 59, cancel "containment" and insert therefor ---contaminants---;

Col. 3, line 2, cancel "surpress" and insert therefor ---suppress---;

UNITED STATES PATENT AND TRADEMARK OFFICE
CERTIFICATE OF CORRECTION

PATENT NO. : 4,413,950
DATED : November 8, 1983
INVENTOR(S) : Michael V. Wiernicki It is certified that error appears in the above-identified patent and that said Letters Patent is hereby corrected as shown below:

Col. 3, line 6, after "4,080,552" insert ---entitled---;

Col. 3, line 12, cancel "42," and insert therefor ---42---;

Col 3, line 14, cancel "42" and insert therefor ---42,---;

Col. 3, line 19, cancel "magnet" and insert therefor ---annular magnet---;

Col. 3, line 20, cancel "guide" and insert therefor ---guide member---;

Col. 3, line 21, cancel "guide" and insert therefor ---guide member---;

Col. 3, line 24, cancel "magnet" and insert therefor ---annular magnet---;

Col. 3, line 26, cancel "magnet" and insert therefor ---annular magnet---;

UNITED STATES PATENT AND TRADEMARK OFFICE
CERTIFICATE OF CORRECTION

PATENT NO. : 4,413,950

DATED : November 8, 1983

INVENTOR(S) : Michael V. Wiernicki

It is certified that error appears in the above-identified patent and that said Letters Patent is hereby corrected as shown below:

Col. 3, line 28, cancel "magnet flux path" and insert therefor ---magnetic flux lines---;

Col. 3, lines 31 and 32, cancel "magnet" and insert therefor ---annular magnet---;

Col 3, line 45, before "battery" insert --1--;

Col. 3, line 46, cancel "60" and insert therefor ---59---;

Col. 3, line 49, cancel "electrical" and insert therefor ---electronic---;

Col. 3, line 50, cancel "pole" and insert therefor ---pole member---;

Col. 3, line 51, cancel "62" and insert therefor ---61---;

Col. 4, line 7, after "of" first occurrence insert --a--;

Col. 4, line 10, cancel "coil" and insert therefor ---solenoid coil---;

UNITED STATES PATENT AND TRADEMARK OFFICE
CERTIFICATE OF CORRECTION

PATENT NO. : 4,413,950

DATED : November 8, 1983

INVENTOR(S) : Michael V. Wiernicki

It is certified that error appears in the above-identified patent and that said Letters Patent is hereby corrected as shown below:

Col. 4, line 26, cancel "A an curve" and insert therefor ---"A" on curve---;

Col. 4, line 48, cancel "point B" and insert therefor ---point "B"---;

Col. 4, line 62, cancel "point A" and insert therefor ---point "A"---;

Col. 5, line 14, cancel "switching circuit" and insert therefor ---electronic switch circuit---;

Col. 5, line 17, cancel "transistor" and insert therefor ---transistors---;

Col. 5, line 18, cancel "solenoid soil" and insert therefor ---solenoid coil---;

Col. 5, line 23, cancel "resistance" and insert therefor ---resistor---;

UNITED STATES PATENT AND TRADEMARK OFFICE
CERTIFICATE OF CORRECTION

PATENT NO. : 4,413,950

DATED : November 8, 1983

INVENTOR(S) : Michael V. Wiernicki

It is certified that error appears in the above-identified patent and that said Letters Patent is hereby corrected as shown below:

Col. 5, line 23, before "zener" insert ---a---;

Col. 5, line 24, cancel "68" and insert ---86---;

Col. 5, line 33, cancel "switching circuit" and insert therefor ---electronic switch circuit---;

Col. 5, line 44, after "with" insert ---a---;

Col. 5, line 46, after "of" insert ---a---;

Col. 5, line 49, after "of" insert ---a---;

Col. 5, line 50, after "through" insert ---a---;

Col. 6, line 4, before "values" insert ---impedance---;

Col. 6, line 5, cancel "capacitance" and insert therefor ---capacitor---;

Col. 6, line 8, cancel "B" and insert ---"B"---;

Col. 6, line 24, after "of" insert ---a---;

UNITED STATES PATENT AND TRADEMARK OFFICE
CERTIFICATE OF CORRECTION

PATENT NO. : 4,413,950
DATED : November 8, 1983
INVENTOR(S) : Michael V. Wiernicki It is certified that error appears in the above-identified patent and that said Letters Patent is hereby corrected as shown below:

Col. 7, line 41, after "said" insert ---electromagnetic---;

Col. 8, line 35, after "said" insert ---solid state switch means comprises---;

Col. 8, line 36, cancel "is at least one transistor";

Col. 8, line 39, delete "solid state" and insert therefor ---at least one transistor---;

Col. 8, line 40, delete "switch".

In the drawings, Figure 1, cancel reference numeral "60" and insert therefor ---59---; Figure 1, cancel reference numeral "62" and insert therefor ---61---.

Signed and Sealed this

Fifth Day of February 1985

[SEAL]

Attest:

DONALD J. QUIGG

Attesting Officer      Acting Commissioner of Patents and Trademarks